United States Patent [19]
Uchida et al.

[11] Patent Number: 5,685,618
[45] Date of Patent: Nov. 11, 1997

[54] ANTI-SKID CONTROL METHOD

[75] Inventors: Kazuma Uchida; Nobuaki Okumoto, both of Hamakita, Japan

[73] Assignee: Nisshinbo Industries Inc., Tokyo, Japan

[21] Appl. No.: 569,941

[22] Filed: Dec. 8, 1995

[30]    Foreign Application Priority Data

Dec. 15, 1994  [JP]  Japan .................... 6-333311

[51] Int. Cl.[6] ............................... B60T 8/58
[52] U.S. Cl. .............. 303/146; 303/147; 303/148; 303/149; 303/165; 303/169; 364/426.016; 364/426.036
[58] Field of Search .................. 303/146, 147, 303/148, 149, 150, 165, 169, 173, 174, 175, 176, 177, 178, 186–190, 199; 364/426.01, 426.02, 426.015, 426.017, 426.024, 426.036, 426.016

[56]    References Cited

U.S. PATENT DOCUMENTS

| | | | |
|---|---|---|---|
| 4,370,715 | 1/1983 | Leiber | 303/154 |
| 4,673,226 | 6/1987 | Every et al. | 303/149 |
| 5,272,636 | 12/1993 | Buschmann et al. | 303/140 |
| 5,302,010 | 4/1994 | Ehmer et al. | 303/147 |
| 5,315,518 | 5/1994 | Lin | 303/148 |

*Primary Examiner*—Douglas C. Butler
*Attorney, Agent, or Firm*—Nikaido, Marmelstein, Murray & Oram LLP

[57]                 ABSTRACT

A method is provided that provides optimum anti-skid control when the vehicle is turning. If a vehicle enters a turning motion, the maximum frictional resistance corresponds to a larger slip ratio; therefore, in this method, the slip threshold is gradually increased to provide the optimum anti-skid control.

8 Claims, 6 Drawing Sheets

RT: DECELERATION THRESHOLD
ST: SLIP THRESHOLD
a,b,c: INTEGER
(c≤a)

ANTI-SKID CONTROL METHOD

BACKGROUND OF THE INVENTION

This invention relates to an anti-skid control device of a vehicle.

In conventional methods, anti-skid control starts when a slip ratio of a wheel of a car that is advancing forward exceeds a threshold value.

The conventional method of anti-skid control presents the problem that if a vehicle is turning, the maximum frictional resistance occurs at a higher slip ratio than when the car is moving in a straight line. Hence, in a conventional device, the frictional force of the road surface is not effectively used, and braking force may thus be insufficient.

OBJECTIVE

The objective of this invention is to increase the braking force of a vehicle that is turning.

A vehicle anti-skid control method for providing optimum braking of the wheels is provided, in which the deceleration (retardation) and slip ratio of each wheel is determined, wherein first, the deceleration of the wheel is compared to a retardation threshold value, and if the deceleration is greater than the threshold value, then braking of the wheel is moderated, and a certain neutral value or increment is subtracted from the slip threshold. The subtracting of the value or increment may be referred to as substracting a decrement, wherein decrement is a certain neutral value. If the deceleration is smaller than the retardation threshold, the slip ratio of the wheel is compared to the slip threshold, wherein if the slip ratio is greater than the slip threshold, braking of the wheel is moderated, and an increment is added to the slip threshold.

In addition, a vehicle anti-skid control method for providing optimum braking of the wheels is provided, in which the speed, deceleration (retardation) and slip ratio of each wheel is determined. First, the deceleration of the wheel is compared to the retardation threshold, and if the deceleration is greater than the threshold value, then braking of the wheel is moderated and a certain neutral value or increment is subtracted from the slip threshold. If the deceleration is smaller than the retardation threshold, the slip ratio of the wheel is compared to the slip threshold, wherein if the left and right rear wheels are rotating at different speeds and the deceleration of the faster of the two wheels is smaller than the retardation threshold, the increment for the slip threshold is reduced, and if the slip ratio is greater than the slip threshold, braking of the wheel is moderated, and the appropriate increment is added to the slip threshold.

In addition, a vehicle anti-skid control method for providing optimum braking of the wheels is provided, in which the speed, deceleration (retardation) and slip ratio of each wheel is determined. First, the deceleration of the wheel is compared to the retardation threshold, and if the deceleration is greater than the threshold value, then braking of the wheel is moderated and a certain neutral value or increment is subtracted from the slip threshold. If the deceleration is smaller than the retardation threshold, the slip ratio of the wheel is compared to the slip threshold, wherein if the left and right rear wheels are both under anti-skid control, the increment for the slip threshold is reduced, and if the slip ratio is greater than the slip threshold, braking of the wheel is moderated, and the appropriate increment is added to the slip threshold.

In addition, a vehicle anti-skid control method for providing optimum braking of the wheels, in which the speed, deceleration (retardation) and slip ratio of each wheel is determined, wherein first, the deceleration of the wheel is compared to the retardation threshold, and if the deceleration is greater than the threshold value, then braking of the wheel is moderated and a certain neutral value or increment is subtracted from the slip threshold. If the deceleration is smaller than the retardation threshold, the slip ratio of the wheel is compared to the slip threshold, wherein if the sum of the increments for the slip threshold of the left and right opposite wheels is less than a prescribed value, the increment for the slip threshold is reduced, and if the slip ratio is larger than the slip threshold, braking of the wheel is moderated, and the appropriate increment is added to the slip threshold.

The present invention provides the following advantages:

1. If a vehicle is turning, the maximum frictional resistance with the road surface occurs at a large slip ratio; hence in this invention, the slip threshold is gradually increased to enable optimum braking control.
2. If the system detects that the vehicle is moving on a road surface with a low coefficient of friction, or if both rear wheels are under anti-skid control, or if the left and right wheels are on different road surfaces, then in the interest emphasizing stability over deceleration, the slip threshold remains virtually unchanged.

BRIEF DESCRIPTION OF THE FIGURES

The above and other objects and the attendant advantages of the present invention will become readily apparent by reference to the following detailed description when considered in conjunction with the accompanying drawings wherein.

DETAILED DESCRIPTION OF THE FIGURES AND OF THE PREFERRED EMBODIMENT

Figure 1:
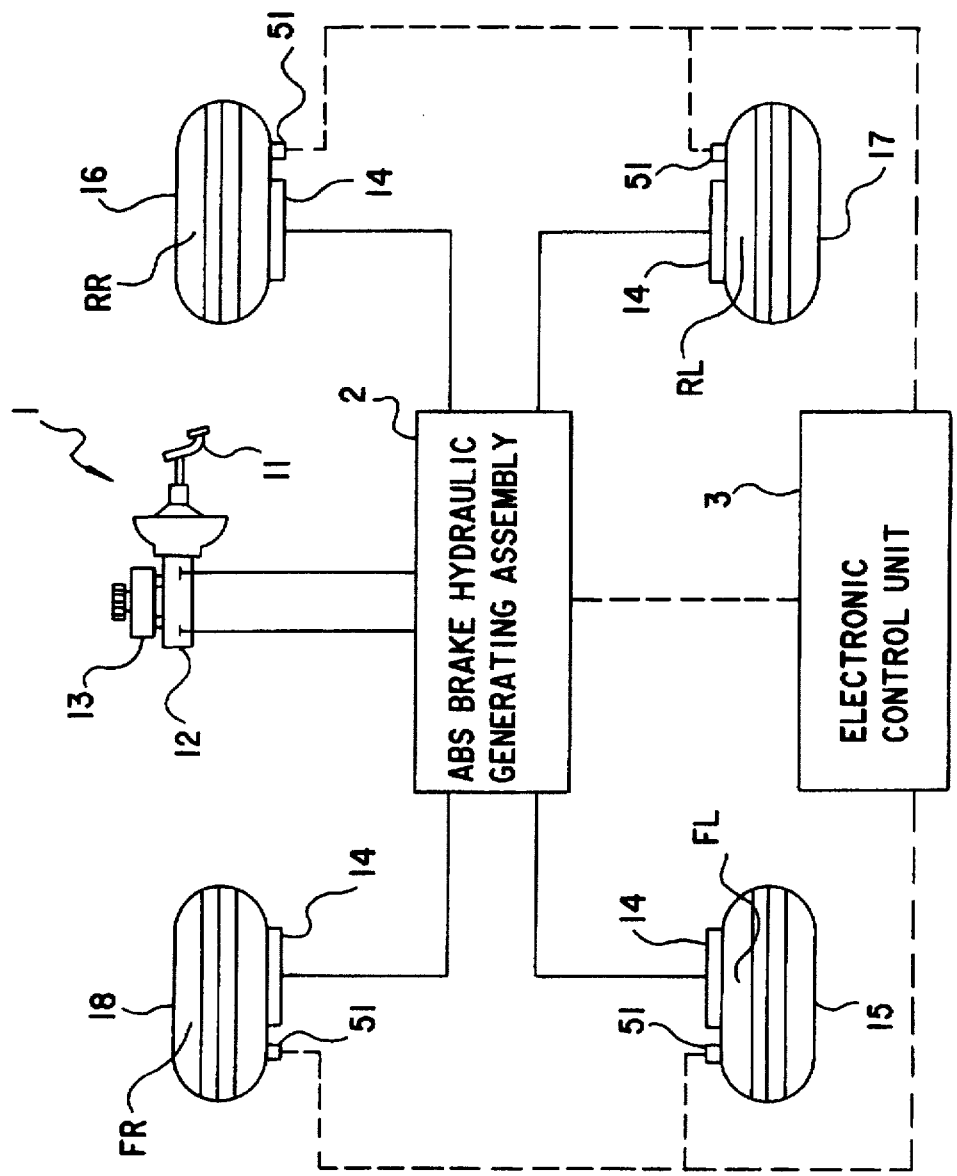
FIG. 1 is a diagram of the ABS control device.

A working example of this invention is explained below with reference to the attached diagrams.

A. Overview of Anti-skid Control Device

In the anti-skid (ABS) control device 1, when the brake pedal 11 is pressed, hydraulic pressure generated at the master cylinder 12 is applied through the ABS brake pressure generating assembly 2, to the respective wheel brake 14, of each wheel 15–18 to brake the vehicle. The wheel speed sensor 51 detects the rotational speed of each wheel and transmits those signals to the electronic control unit 3 which computes the deceleration and slip ratio of the wheels. During braking, if the deceleration of a wheel exceeds a threshold value, or if the slip ratio exceeds the threshold value, the electronic control unit 3 activates the ABS brake pressure generating assembly to control the skidding of the respective wheel 15–18. The electronic control unit 3 can be comprised of hardware, an input/output device, memory, central processor and other general computing devices.

B. Overview and Configuration of Brake Lines

Figure 2:
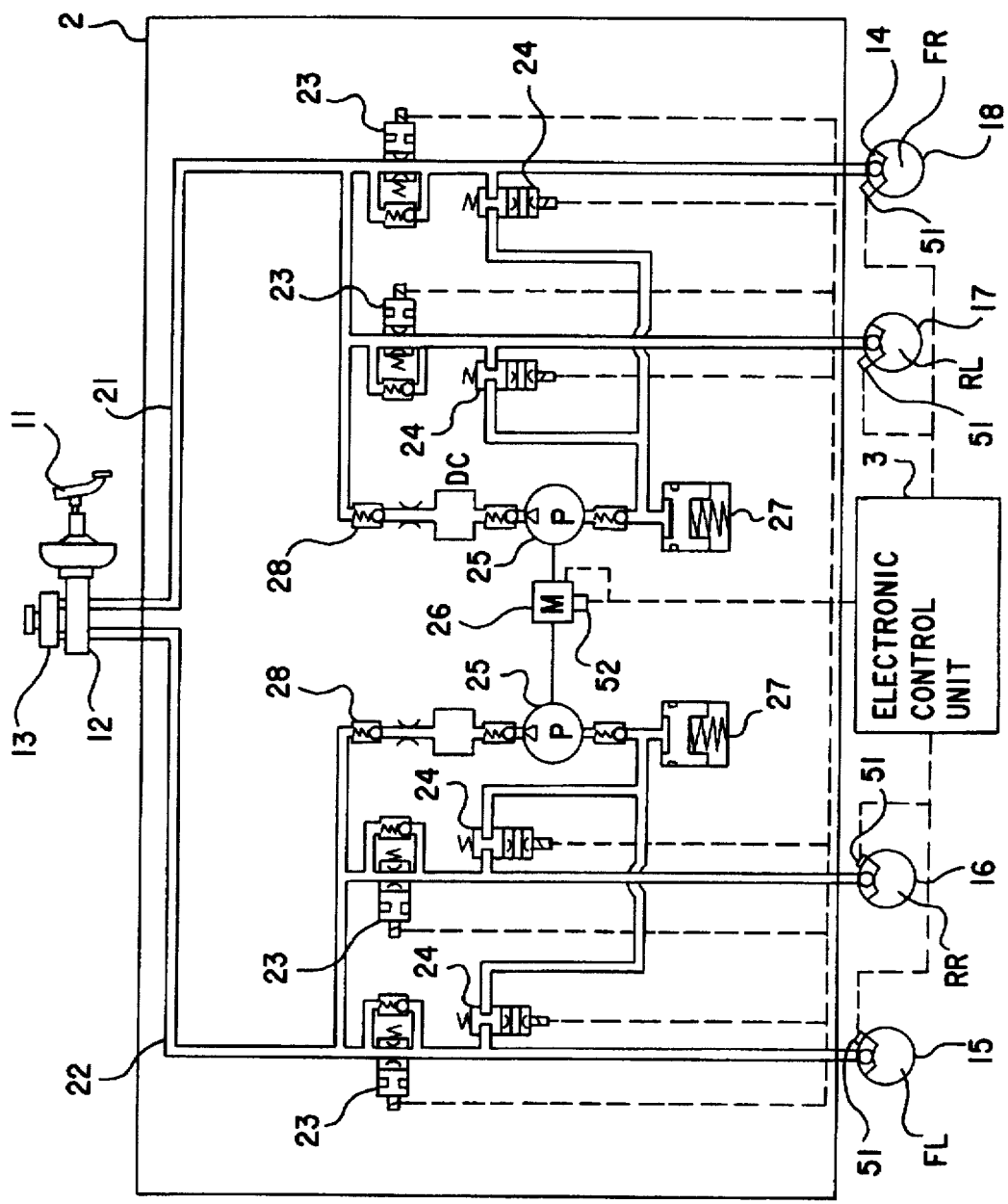
FIG. 2 is a diagram of the ABS brake pressure generating assembly.
Figure 3:
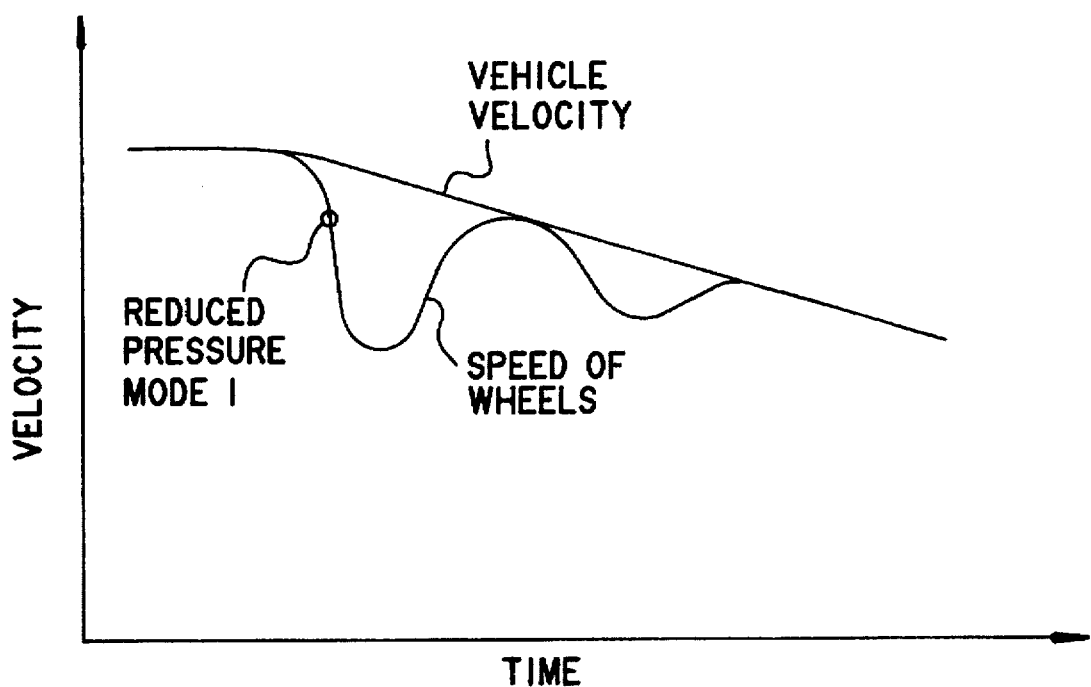
FIG. 3 is an explanatory diagram of deceleration in the reduced pressure mode (1).
Figure 4:
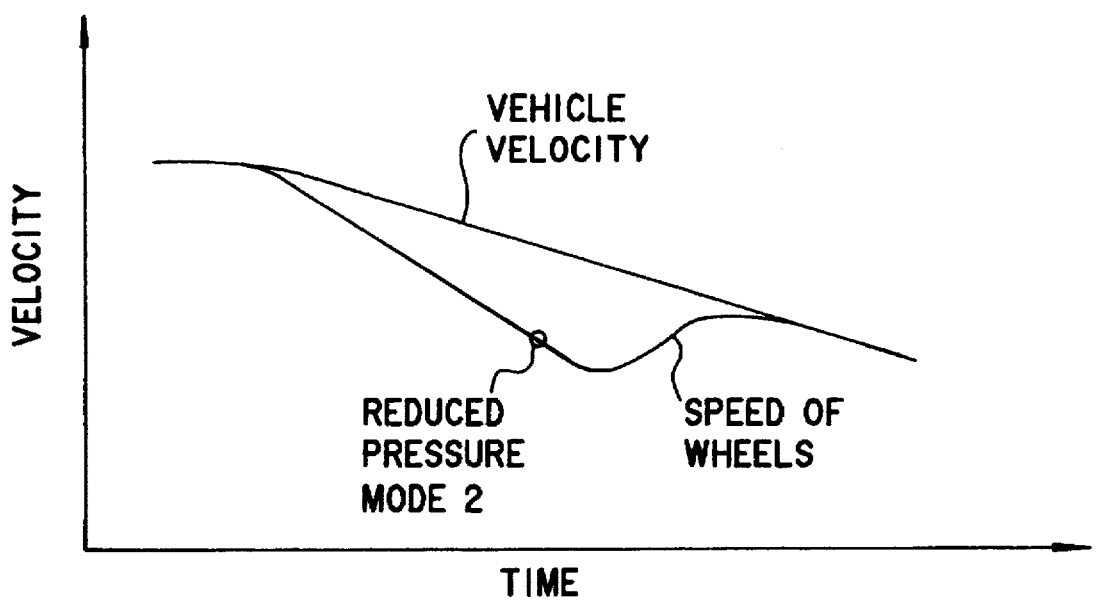
FIG. 4 is an explanatory diagram of deceleration in the reduced pressure mode (2).

FIG. 2 illustrates an example of two separate brake lines, specifically a first brake line 21 and a second brake line 22, connected through the master cylinder 12 in an X-configuration. The main reservoir 13 is a fluid chamber that supplies brake fluid to the master cylinder 12. The first brake line 21 is connected through inlet valves 23 to the wheel brake 14 of the right front wheel 18 and left rear wheel 17, and through the outlet valves 24 to the auxiliary reservoir 27. Similarly, the second brake line 22 is connected through inlet valves 23 to the wheel brakes 14 of the right rear wheel 16 and left front wheel 15, and through outlet valves 24 to the auxiliary reservoir 27.

An anti-skid control brake pump 25 is driven by the motor 26. The electronic control unit 3 receives signals from the respective wheel speed sensor 51, and starts anti-skid control as necessary. If so, the motor 26 is activated to operate the pump 25 in order to supply brake fluid from the auxiliary reservoir 27 to the first brake line 21 and the second brake line 22. Inlet valves 23 and outlet valves 24 are opened and closed repeatedly to adjust the brake pressure to the wheel brake 14.

C. Anti-skid Control Threshold Values

For anti-skid control, two threshold values are used to determine the point at which to start reducing the brake pressure. One value is the retardation threshold, wherein if the deceleration of the wheel exceeds this value, then the brake pressure is reduced to brake the wheel more gently this is also referred to as the reduced pressure mode (1). This mode is used for quick response sudden braking.

The second value is the slip threshold, wherein if the slip ratio of the wheel increases and exceeds the value, then the brake pressure is reduced (this is also referred to as the reduced pressure mode (2)). This mode is used when the slip is increasing gradually.

D. Slip Ratio (S) of Wheels as Function of the Coefficient of Friction of the Road Surface (μ)

Figure 5:
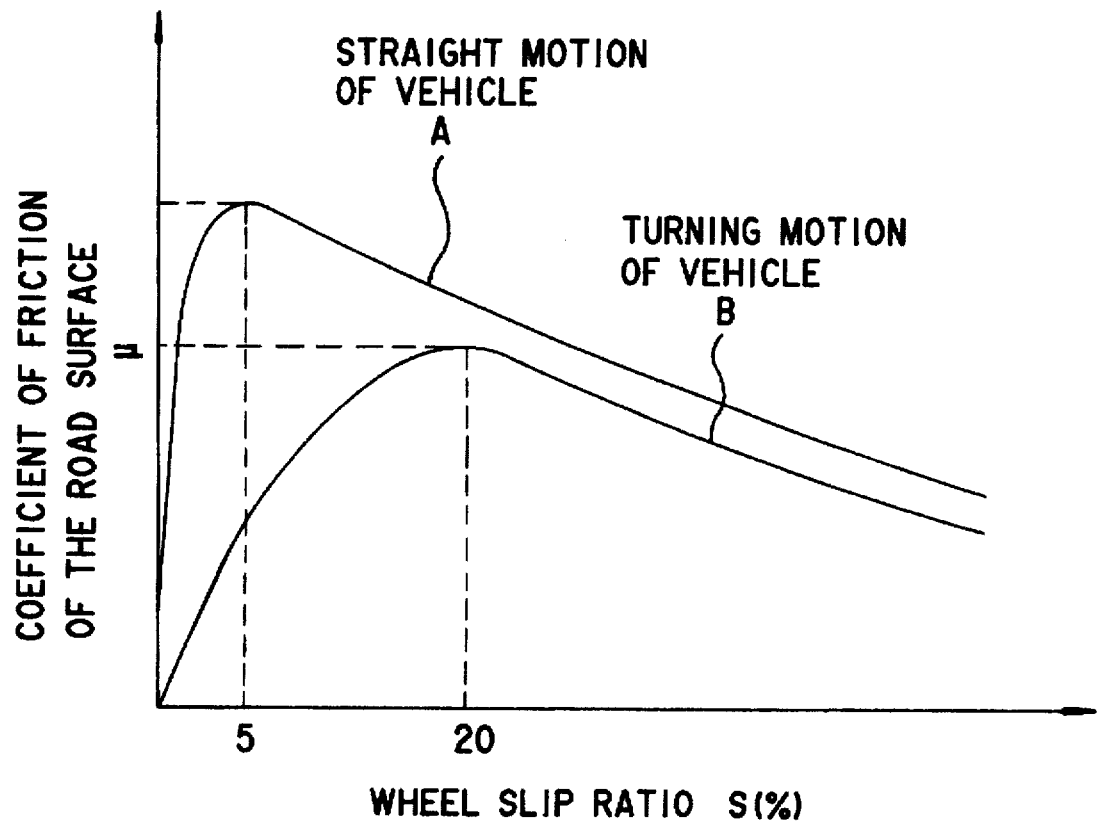
FIG. 5 illustrates the coefficient of friction for a given road surface as a function of slip ratio.

The coefficient of friction of the wheels of a vehicle relative to the road surface follows a curve as shown in FIG. 5. Here the horizontal axis represents the slip ratio, set forth by $$\text{Slip ratio}(s) = \frac{\text{vehicle frame speed} - \text{wheel speed}}{\text{vehicle frame speed}}$$

and the vertical axis represents the coefficient of friction of the road surface (μ). If the vehicle is advancing forward, the coefficient changes with the state of the road surface and other factors, which under normal circumstances has the characteristics of a normal curve A. In contrast, if the vehicle is turning, the coefficient has the characteristics of curve B, wherein the maximum coefficient corresponds to a higher slip ratio than for normal travel; for example, the maximum coefficient shifts from a slip ratio of 5% to close to 20%. Accordingly, for optimum braking under normal travel, the slip ratio should be maintained close to the value of the peak of curve A (for example, 5%); but if the car is turning, then the slip ratio should preferably be maintained close to the value of the peak of curve B (for example, 20%). That is, it is preferable that the slip ratio during braking should be changed as a function of the driving state.

E. Control During Turning

Normally, for optimum anti-skid control, reduced pressure mode (1) which uses the retardation threshold value (RT) and reduced pressure mode (2) which uses the slip threshold value (ST) are used in combination to the appropriate degree. However, if the vehicle is turning, usually the slip ratio gradually increases, in which case, control is performed mostly under reduced pressure mode (2). For this, it is preferable that an optimum coefficient of friction be obtained by changing the slip threshold to a larger value, and maintain the slip ratio of the wheel close to the value of the peak in curve B in FIG. 5. That is, upon entering reduced pressure mode (2), the slip threshold is increased by a prescribed increment "a", then with the next control in reduced pressure mode (2), the new slip ratio will correspond to an increased coefficient of friction to provide optimum control. Conversely, if the slip threshold becomes too large, and will not correspond to the optimum coefficient of friction, then increasing the brake pressure will cause an abrupt deceleration, and the system will enter reduced pressure mode (1), wherein a prescribed certain neutral value or increment "b" is subtracted from the current slip threshold to make it smaller. In this manner, an optimum slip threshold can be obtained by repeatedly increasing and decreasing the slip threshold. At the end of an anti-skid control operation, the slip threshold can be reset to its original value, or can be maintained at the revised value of the previous anti-skid control operation.

F. Example of Taking Reduced Pressure Mode

Figure 6:
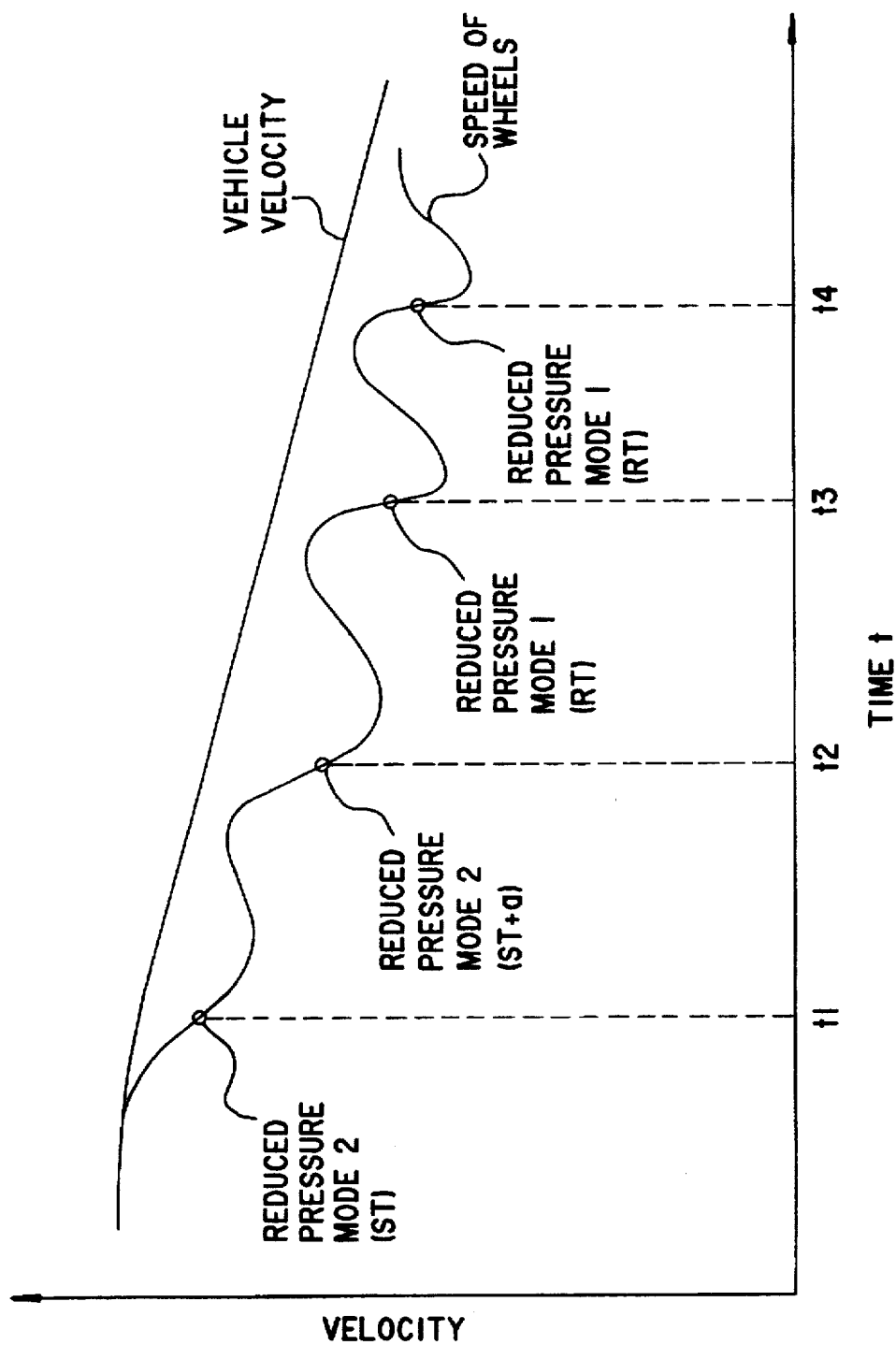
FIG. 6 illustrates an example of ABS control under a combined reduced pressure mode (1) and reduced pressure mode (2).
Figure 7:
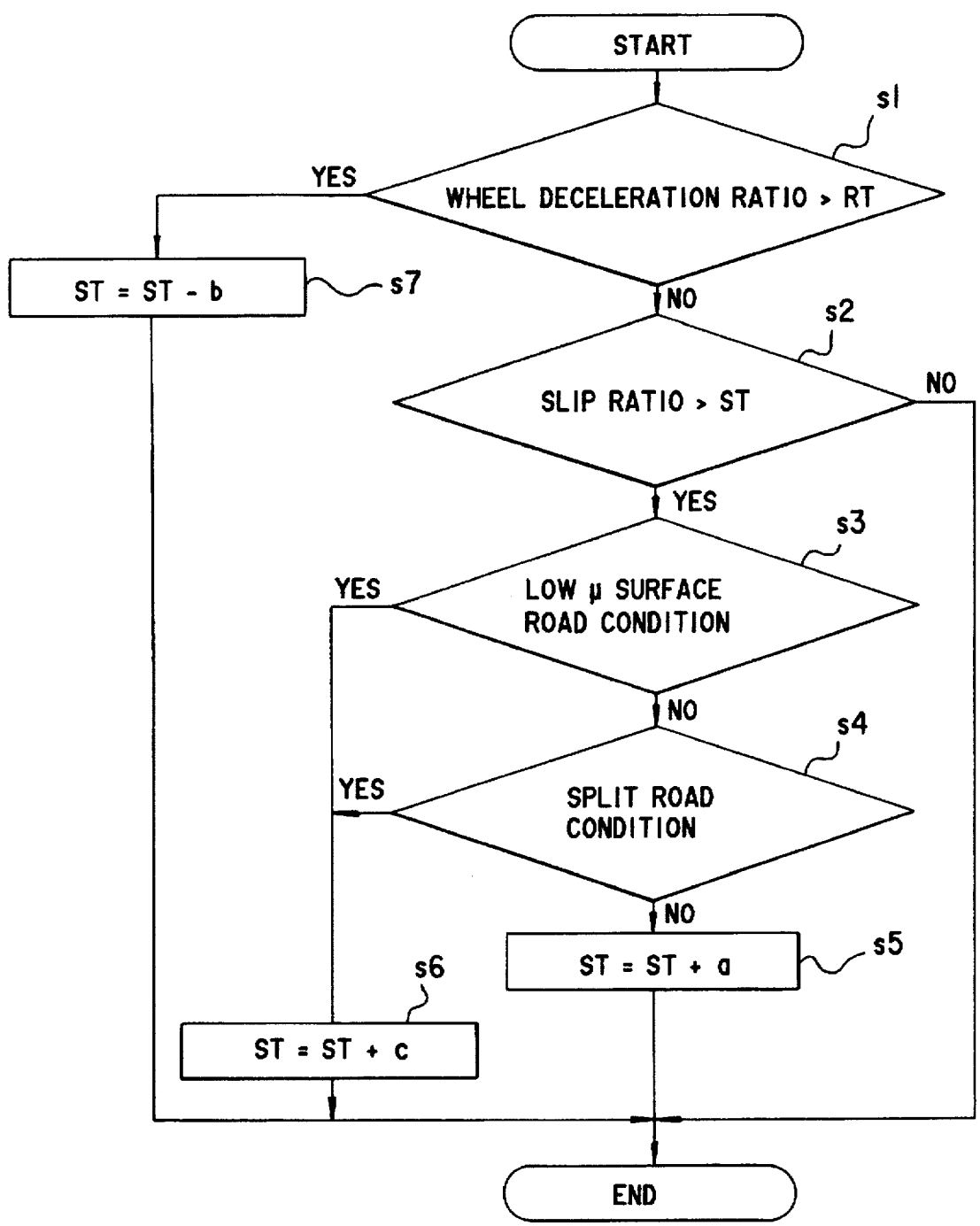
FIG. 7 is the process for ABS control.

FIG. 6 illustrates an example of control operation during turning. Here, the horizontal axis represents the time "t", and the vertical axis represents the speed, and indicates the wheel speed and that the vehicle is turning, the slip ratio exceeds the slip threshold (ST) at time "t1", wherein control is performed under reduced pressure mode (2), and brake pressure is reduced to increase the rotational speed of the wheels. At this time, the increment "a" is added to the slip threshold (ST+a) to increase the slip threshold (ST). If brake pressure is again applied to the wheels, and the slip ratio gradually increases to exceed the new slip threshold (ST+a) at time "t2", then control is performed again under reduced pressure mode (2), and the increment "a" again is added the current slip threshold (ST+a+a).

At time "t3", there is an abrupt deceleration, at which point deceleration exceeds the retardation threshold (RT), and control is performed under reduced pressure mode (1). In this mode, the certain neutral value or increment "b" is subtracted from the current slip threshold (ST+2a−2b), and the slip threshold is reduced. Further control is performed under reduced pressure mode (1) at time "t4", wherein the slip threshold is reduced further (ST+2a−2b). In this manner, the wheels are braked at the optimum slip threshold by repeated control under a combination of reduced pressure mode (1) and reduced pressure mode (2).

G. Example of Not Taking Reduced Pressure Mode

Turning control ceases on road surfaces with a low coefficient of friction, or if both rear wheels are under anti-skid control, or if the left and right wheels are on different road surfaces. In these cases, vehicle stability is deemed to be more important than inadequate deceleration, and the increment "a" for the reduced pressure mode is set at "0" or "c", (c≦a).

If the two rear wheels are rotating at different speeds and the deceleration of the faster of the two wheels is smaller than the retardation threshold, then the road surface could have a low coefficient of friction, in which case the increment "a" is set at "0" or "c", (c≦a), for a smaller increase in the slip threshold.

In addition, if both rear wheels are under anti-skid control, the increment "a" is set at "0" or "c", (c≦a) for better stabilization. As well, if the cumulative value of the increments for the slip thresholds of opposite left and right wheels is less than a prescribed value, then it is possible that the left and right wheels could each be on surfaces of differing frictional coefficient, in which case, the increment "a" is set at "0" or a minimal value.

H. Anti-skid Control Processes

Illustrating one example of anti-skid control, first, the deceleration of the wheels is compared to the retardation threshold (RT) (s1). If deceleration is greater than the retardation threshold (that is, deceleration is large), then control is performed under reduced pressure mode (1), in which case the slip threshold (ST) is decremented (s7). If deceleration is smaller than the retardation threshold, then the slip ratio and the slip threshold are compared (s2). If the slip ratio is larger than the slip threshold, then a decision is made as to whether the road surface has a low coefficient of friction μ or not (s3). If μ is large, than a decision is made as to whether the opposite left and right wheels are on different road surfaces (s4). If so, then the slip threshold is increased by a very minimal amount (s6). If the wheels are not on different road surfaces, then control is performed under reduced pressure mode (2), and the slip threshold is increased by (s5).

It is readily apparent that the above-described has the advantage of wide commercial utility. It should be understood that the specific form of the invention herein above described is intended to be a representative only, as certain modifications within the scope of these teachings will be apparent to those skilled in the art.

Accordingly, reference should be made to the following claims in determining the full scope of the invention.

We claim:

1. A vehicle anti-skid control method for providing optimum braking of the wheels, comprising:

determining deceleration and slip ratio of each wheel, wherein first, the deceleration of the wheel is compared to a retardation threshold value, and if the deceleration is greater than the retardation threshold value, then braking of the wheel is moderated, and a neutral value is subtracted from a slip threshold; and if the deceleration is smaller than the retardation threshold, the slip ratio of the wheel is compared to a slip threshold, wherein if the slip ratio is greater than the slip threshold, braking of the wheel is moderated, and an increment is added to the slip threshold.

2. A vehicle anti-skid control method for providing optimum braking of the wheels, comprising:

determining speed, deceleration and slip ratio of each wheel, wherein first, the deceleration of the wheel is compared to a retardation threshold value, and if the deceleration is larger than the retardation threshold value, then braking of the wheel is moderated and a neutral value is subtracted from a slip threshold; and if the deceleration is smaller than the retardation threshold, the slip ratio of the wheel is compared to the slip threshold, wherein if the left and right rear wheels are rotating at different speeds and a deceleration of a faster of the two wheels is smaller than the retardation threshold, an increment for the slip threshold is reduced, and if the slip ratio is greater than the slip threshold, braking of the wheel is moderated, and the appropriate increment is added to the slip threshold.

3. A vehicle anti-skid control method that provides optimum braking of the wheels, comprising:

determining speed, deceleration and slip ratio of each wheel, wherein first, a deceleration of a wheel is compared to the retardation threshold value, and if the deceleration is greater than the threshold value, then braking of the wheel is moderated and a neutral value is subtracted from a slip threshold;

if the deceleration is smaller than the retardation threshold, the slip ratio of the wheel is compared to the slip threshold, wherein if the left and right rear wheels are both under anti-skid control, an increment for the slip threshold is reduced; and if the slip ratio is greater than the slip threshold, braking of the wheel is moderated, and an increment is added to the slip threshold.

4. A vehicle anti skid control method for providing optimum braking of the wheels, comprising:

determining speed, deceleration and slip ratio of each wheel, wherein first, the deceleration of the wheel is compared to the retardation threshold value, and if the deceleration is greater than the retardation threshold value, then braking of the wheel is moderated and a neutral value is subtracted from a slip threshold;

if the deceleration is smaller than the retardation threshold, the slip ratio of the wheel is compared to the slip threshold, wherein if the sum of increments for the slip threshold of the left and right opposite wheels is less than a prescribed value, an increment for the slip threshold is reduced; and if the slip ratio is larger than the slip threshold, braking of the said wheel is moderated, and an increment is added to the slip threshold.

5. A vehicle anti-skid control method that comprises:

determining a deceleration of a wheel and generating a deceleration signal;

determining a slip ratio of said wheel and generating a slip ratio signal;

inputting said deceleration signal and said slip ratio signal into a control unit;

wherein said control unit compares the deceleration to a retardation threshold value;

if the deceleration is greater than the retardation threshold value said control unit outputs a signal to a brake hydraulic generating system so as to moderate braking of said wheel, and said control unit subtracts a neutral value from a slip threshold; and if the deceleration is smaller than the retardation threshold, the slip ratio of said wheel is compared to said slip threshold, wherein if the slip ratio is greater than the slip threshold, said control unit outputs a signal to said brake hydraulic generating system so as to moderate braking of said wheel and said control unit adds an increment to said slip threshold.

6. A vehicle anti-skid control method that comprises:

determining a speed of a left wheel and generating a speed signal;

determining a deceleration of said left wheel and generating a deceleration signal;

determining a slip ratio of said left wheel and generating a slip ratio signal;

determining a speed of a right wheel and generating a speed signal;

determining a deceleration of said right wheel and generating a deceleration signal;

determining a slip ratio of said right wheel and generating a slip ratio signal;

inputting said speed signals, deceleration signals and said slip ratio signals into a control unit;

wherein said control unit compares the deceleration to a retardation threshold value; and if the deceleration is greater than the retardation threshold value said control unit outputs a signal to a brake hydraulic generating system so as to moderate braking, and said control unit subtracts a neutral value from a slip threshold; and if the deceleration is smaller than the retardation threshold, the slip ratio is compared to said slip threshold, wherein if said left and right wheels are rotating at different speeds and a deceleration of a faster of said left and right wheel is smaller than the retardation threshold value, said control unit reduces said slip threshold, and if the slip ratio of the faster wheel is greater than the slip threshold, the control unit outputs a signal to said brake hydraulic generating system so as to moderate braking of said wheel and said control unit adds an increment to the slip threshold.

7. A vehicle anti-skid control method that comprises:

determining a speed of a left wheel and generating a speed signal;

determining a deceleration of said left wheel and generating a deceleration signal;

determining a slip ratio of said left wheel and generating a slip ratio signal;

determining a speed of a right wheel and generating a speed signal;

determining a deceleration of said right wheel and generating a deceleration signal;

determining a slip ratio of said right wheel and generating a slip ratio signal;

inputting said speed signals, deceleration signals and said slip ratio signals into a control unit;

wherein said control unit compares the deceleration to a retardation threshold value;

if the deceleration is greater than the retardation threshold value said control unit outputs a signal to a brake hydraulic generating system so as to moderate braking, and said control unit subtracts a neutral value from a slip threshold; and if the deceleration is smaller than the retardation threshold, the slip ratio is compared to said slip threshold, wherein if said left and right wheels are both under anti-skid control, an increment for said slip threshold is reduced and if the slip ratio is greater than the slip threshold, the control unit outputs a signal to said brake hydraulic generating system so as to moderate braking of said wheel and said control unit adds an increment to the slip threshold.

8. A vehicle anti-skid control method that comprises:

determining a speed of a first wheel and generating a speed signal;

determining a deceleration of said first wheel and generating a deceleration signal;

determining a slip ratio of said first wheel and generating a slip ratio signal;

determining a speed of a second wheel disposed oppositely to said first wheel and generating a speed signal;

determining a deceleration of said second wheel and generating a deceleration signal;

determining a slip ratio of said second wheel and generating a slip ratio signal;

inputting said speed signals, said deceleration signals and said slip ratio signals into a control unit;

wherein said control unit compares the deceleration to a retardation threshold value;

if the deceleration is greater than the retardation threshold value said control unit outputs a signal to a brake hydraulic generating system so as to moderate braking, and said control unit subtracts a neutral value from a slip threshold; and if the deceleration is smaller than the retardation threshold, the slip ratio is compared to said slip threshold, wherein if a sum of increments for said slip threshold of said first and second wheels is less than a prescribed value, an increment for said slip threshold is reduced and if the slip ratio is larger than the slip threshold, the control unit outputs a signal to said brake hydraulic generating system so as to moderate braking of said wheel and said control unit adds an increment to the slip threshold.

* * * * *